(12) United States Patent
Gao et al.

(10) Patent No.: US 11,150,823 B2
(45) Date of Patent: Oct. 19, 2021

(54) METHOD, DEVICE AND COMPUTER PROGRAM PRODUCT FOR SPLITTING DISK SET

(71) Applicant: EMC IP Holding Company LLC, Hopkinton, MA (US)

(72) Inventors: Hongpo Gao, Beijing (CN); Shaoqin Gong, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/821,392

(22) Filed: Mar. 17, 2020

(65) Prior Publication Data

US 2020/0341663 A1 Oct. 29, 2020

(30) Foreign Application Priority Data

Apr. 29, 2019 (CN) .......................... 201910354653.2

(51) Int. Cl.
*G06F 3/06* (2006.01)
*G06F 11/10* (2006.01)
*G06F 11/16* (2006.01)

(52) U.S. Cl.
CPC .......... *G06F 3/0634* (2013.01); *G06F 3/0619* (2013.01); *G06F 3/0647* (2013.01); *G06F 3/0653* (2013.01); *G06F 3/0659* (2013.01); *G06F 3/0689* (2013.01)

(58) Field of Classification Search
None
See application file for complete search history.

(56) References Cited

U.S. PATENT DOCUMENTS

| | | |
|---|---|---|
| 7,958,304 B1 * | 6/2011 | Goel .................. G06F 11/1096 711/114 |
| 9,690,660 B1 | 6/2017 | Robins et al. |
| 9,864,643 B1 | 1/2018 | Mullis, II et al. |
| 10,126,988 B1 | 11/2018 | Geng et al. |
| 10,372,384 B2 | 8/2019 | Yousheng et al. |
| 10,579,593 B2 | 3/2020 | Ivan et al. |
| 10,678,643 B1 | 6/2020 | Jian et al. |
| 10,733,042 B2 | 8/2020 | Hongpo et al. |
| 10,860,494 B2 | 12/2020 | Liam et al. |
| 10,983,874 B2 | 4/2021 | Kang et al. |
| 11,010,083 B2 | 5/2021 | Changyu et al. |

* cited by examiner

*Primary Examiner* — Michael Alsip
(74) *Attorney, Agent, or Firm* — BainwoodHuang

(57) ABSTRACT

Techniques for splitting a disk set involve obtaining stripe shared information in a first disk set, wherein the information indicates a stripe set that shares a plurality of disks. The techniques further involve determining the number of disks to be split from the first disk set. The techniques further involve splitting the first disk set into a first portion and a second portion based on the information and the number of disks to be split, wherein the second portion and one or more newly added disks form a second disk set, and both the first disk set and the second disk set store data through Redundant Array of Independent Disks (RAID). In the case that a current disk set needs to be split due to adding one or more new disks, disks are selected using the collected information, thereby reducing data movements caused by splitting of the disk set.

19 Claims, 5 Drawing Sheets

METHOD, DEVICE AND COMPUTER PROGRAM PRODUCT FOR SPLITTING DISK SET

CROSS REFERENCE TO RELATED APPLICATION

This application claims priority to Chinese Patent Application No. CN201910354653.2, on file at the China National Intellectual Property Administration (CNIPA), having a filing date of Apr. 29, 2019, and having "METHOD, DEVICE AND COMPUTER PROGRAM PRODUCT FOR SPLITTING DISK SET" as a title, the contents and teachings of which are herein incorporated by reference in their entirety.

FIELD

Embodiments of the present disclosure generally relate to the field of data storage, and more specifically, to a method, device and computer program product for splitting a disk set.

BACKGROUND

Redundant Array of Independent Disks (RAID) is a data backup technology that can combine multiple independent physical disks into an array of disks (i.e. logical disks) in different ways, thereby providing higher storage and reliability performance than a single disk. In order to recover data when a certain disk in RAID fails, usually one (e.g. RAID 1, RAID 3 or RAID 5) or more (e.g. RAID 6) parity information blocks are arranged in RAID. Take RAID 5 for an example. If a certain disk in RAID fails, one new disk is added to RAID. Then, RAID may calculate data in the failed disk through distributed parity information, and rebuild data in the new disk so as to recover the data.

Generally, in RAID, there may exist multiple disks with a size larger than or equal to the RAID width, wherein each disk is divided into multiple disk slices, each slice has a fixed size (e.g. 4 GB). RAID usually stores data through a lot of stripes. For example, in RAID 5, five disk slices on five disks may be combined into one RAID stripe, i.e. four data blocks and one parity information block (i.e. 4D+1P). When a certain disk in RAID fails, rebuilding may be performed through distributed parity information so that data can be recovered and will not be lost.

SUMMARY

Embodiments of the present disclosure provide a method, device and computer program product for splitting a disk set.

In one aspect of the present disclosure, provided is a method for splitting a disk set. The method includes: obtaining stripe shared information in a first disk set, wherein the stripe shared information indicates a stripe set that shares a plurality of disks; in response to determining that the first disk set is to be split, determining the number of disks to be split from the first disk set; and splitting the first disk set into a first portion and a second portion based on the stripe shared information and the number of disks to be split, wherein the second portion and one or more newly added disks form a second disk set, and both the first disk set and the second disk set store data through RAID.

In another aspect of the present disclosure, provided is a device for splitting a disk set. The device includes a processing unit and a memory, wherein the memory is coupled to the processing unit and storing instructions thereon. The instructions, when executed by the processing unit, perform acts including: obtaining stripe shared information in a first disk set, wherein the stripe shared information indicates a stripe set that shares a plurality of disks; in response to determining that the first disk set is to be split, determining the number of disks to be split from the first disk set; and splitting the first disk set into a first portion and a second portion based on the stripe shared information and the number of disks to be split, wherein the second portion and one or more newly added disk form a second disk set, and both the first disk set and the second disk set store data through RAID.

In a further aspect of the present disclosure, provided is a computer program product. The computer program product is tangibly stored on a non-transient computer readable medium and includes machine executable instructions. The machine executable instructions, when being executed, cause a computer to perform a method or process according to embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objects, features and advantages of the present disclosure will become more apparent, wherein the same reference numerals typically represent the same components in the example embodiments of the present disclosure.

DETAILED DESCRIPTION

Figure 1:
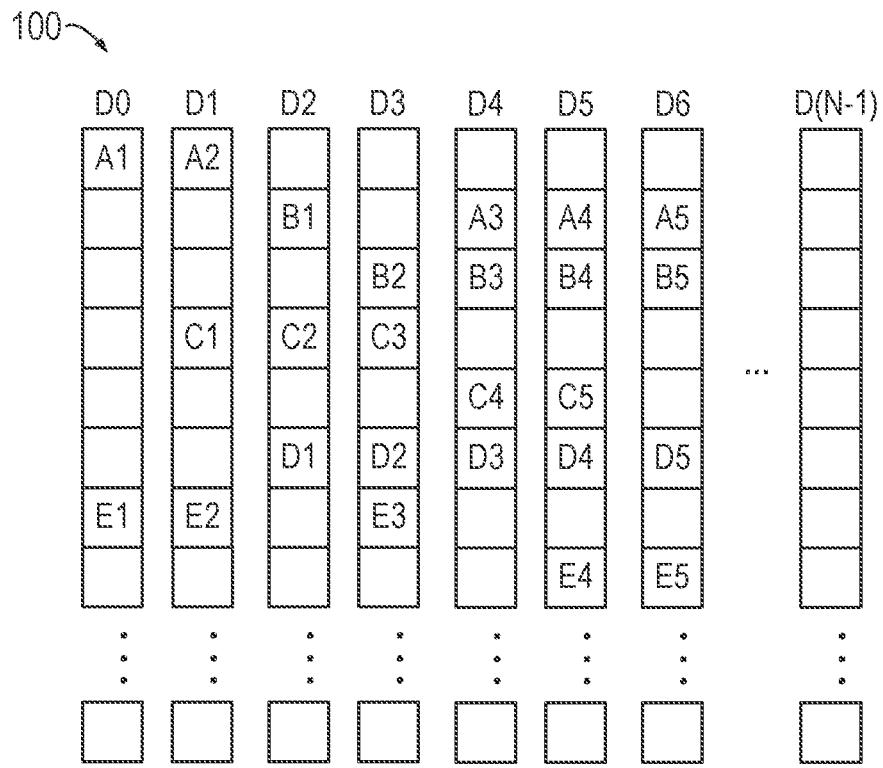
FIG. 1 shows a schematic view of RAID stripes in a storage device according to embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Some preferable embodiments will be described in more detail with reference to the accompanying drawings, in which the preferable embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art.

The terms "comprise" and its variants used here are to be read as open terms that mean "comprise, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other definitions, explicit and implicit, might be included below.

In a storage system, a RAID disk set may be formed by a number of disks that are larger than the RAID width. Within certain scope, the more disks in the RAID disk set, the better the RAID performance. However, the disk count in a RAID disk set is subject to an upper limit, beyond which the performance of the storage system will decrease. Therefore, when one or more new disks are added to the RAID disk set, if the resulting disk count exceeds the upper limit, then the current RAID disk set has to be split into two new disk sets. Traditionally, when an existing RAID disk set needs to be split due to adding one or more new disk, the last several disks in the current disk set are usually chosen to be split. However, since there exists data in stripes on split disks and data cannot be stored across two RAID disk sets, a vast amount of data has to be moved between two RAID disk sets after splitting. Excessive data movements not only might affect normal user IO operations, but also might accelerate the wear level of the storage device.

To this end, embodiments of the present disclosure propose a solution for splitting a disk set based on stripe shared information in the disk set. According to embodiments of the present disclosure, where a current disk set has to be split due to adding one or more new disks, disk(s) that are suitable to be split are selected using pre-collected stripe shared information, so as to reduce data movements caused by splitting of the disk set and accelerate the splitting process of the disk set. This can not only reduce the effect on normal user IO operations but also reduce the wear of the storage device. If the more stripes share the split disks, the less stripes need to be moved. In addition, embodiments of the present disclosure can increase the data reliability.

Basic principles and several example implementations of the present disclosure will be illustrated with reference to FIGS. 1 to 7. It should be understood that these example implementations are provided only to enable those skilled in the art to better understand and further implement embodiments of the present disclosure, rather than limiting the scope of the present disclosure in any way. It should be further understood although RAID 5 is used as an example of RAID in the following embodiments of the present disclosure, other type of RAID may also be used, and the present disclosure is not limited in this regard. RAID 5 is composed of block-level stripes with distributed parity information which may be distributed over multiple disks. Each stripe may include five disk slices, i.e. four data blocks and one parity information block (4D+1P). When a disk in RAID fails, recovery may be performed through distributed parity information, so that data can be recovered and will not be lost.

FIG. 1 shows a schematic view of RAID stripes in a storage device 100 according to embodiments of the present disclosure, which depicts an example of using "4D+1P" RAID 5 on N disks, wherein N may be, for example, 25 or other integer larger than 6 and less than 25. As shown in FIG. 1, each disk may be divided into fixed-size disk slices (e.g. each disk slice size is 4 GB), and disks are denoted as disks D0, D1, D2, D3 . . . D(N-1), wherein five disk slices on five disks may form one RAID stripe. The smallest allocation unit in the stripe is a physical large block (PLB), whose size may be 2 MB for example. In the example of FIG. 1, some disk slices (such as disk slices with alphanumeric marks) on disks store data, while others do not store data yet. Disk slices A1, A2, A3, A4 and A5 on different disks form a first stripe, disk slices B1, B2, B3, B4 and B5 form a second stripe, disk slices C1, C2, C3, C4 and C5 form a third stripe, disk slices D1, D2, D3, D4 and D5 form a fourth stripe, and disk slices E1, E2, E3, E4 and E5 form the fifth stripe. Generally speaking, in order to guarantee a wear balance among disks, RAID usually selects a disk with the least allocated disk slice, so that data can be evenly stored over multiple disks.

As shown in FIG. 1, if there is a need to create one RAID stripe, then five disk slices may be randomly selected from five different disks. Therefore, data and parity information will be distributed over disk slices on multiple disks. In addition, a spare backup disk may be reserved in the disk set, e.g. the disk D(N-1) may serve as the spare backup disk. When a certain disk among the disks D0 to D(N-2) fails, after the timer timeout, the disk D(N-1) may be used to replace the failed disk and rebuild data. In general, the more disks are involved in the rebuilding process, the faster the rebuilding speed is. However, as disks in the RAID disk set increase, the probability that two disks in the RAID disk set simultaneously fail also increases. Therefore, it is necessary to trade off the optimal disk count for RAID against the reliability, whose value may be obtained through experiment. The optimal disk count for RAID 5 may be 25 in some scenarios or other value determined in other scenarios.

Figure 2:
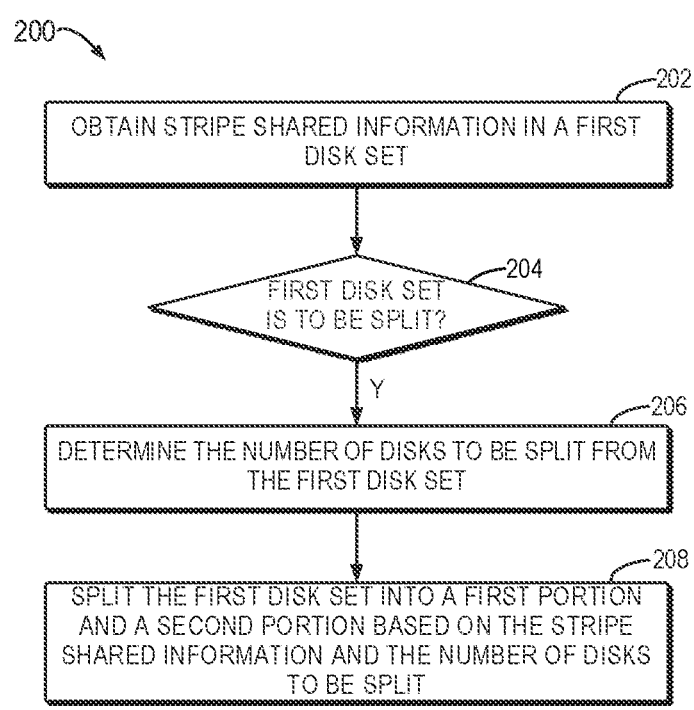
FIG. 2 shows a flowchart of a method for splitting a disk set according to embodiments of the present disclosure.

FIG. 2 shows a flowchart of a method 200 for splitting a disk set according to embodiments of the present disclosure. At 202, stripe shared information in a first disk set is obtained, wherein the stripe shared information indicates a set of stripes that share multiple disks.

Figure 5:
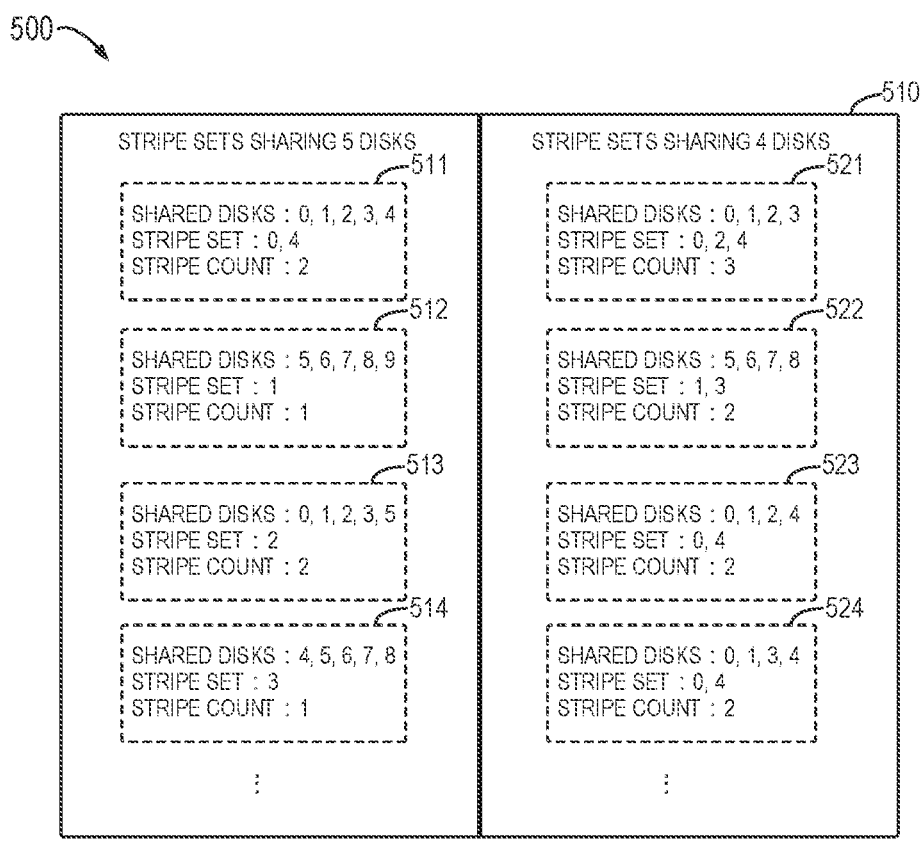
FIG. 5 shows a schematic view of an example structure of stripe shared information according to embodiments of the present disclosure.

For example, during system booting up, stripe information on shared disks in the disk set is collected by: determining the corresponding IDs of five disks by traversing each stripe. According to embodiments of the present disclosure, the stripe shared information may be used for more accurate disk splitting, which may also be referred to as "relationship data." FIG. 5 shows below a schematic view of an example structure of stripe shared information according to embodiments of the present disclosure.

At 204, it is determined whether the first disk set needs to be split or not. For example, if a splitting condition is not satisfied, then there is no need to perform the method for splitting a disk set according to embodiments of the present disclosure. On the contrary, if the splitting condition is satisfied and the first disk set needs to be split, then at 206 the number of disks to be split from the first disk set is determined. The disk count in one RAID disk set is subject to an upper limit, beyond which a new disk set needs to be created. Usually, RAID cannot be deployed across multiple disk sets. For example, in case of RAID 5, when a new disk is added, several disks have to be split from the current disk for the purpose of forming a new RAID disk set with the newly added disk. For example, FIGS. 3A and 3B show an example of five disks splitting from the current disk set, and FIGS. 4A and 4B show an example of four disks splitting from the current disk set.

Still with reference to FIG. 2, at 208, the first disk set is split into a first portion and a second portion based on the stripe shared information and the number of disks to be split, wherein the second portion and one or more newly added disks form a second disk set, and the first disk set and the second disk set store data through RAID respectively. After the number of disks to be split is determined, multiple disks most suitable to be split may be selected based on the stripe shared information. In this way, disks suitable to be split are selected using the pre-collected stripe shared information, which reduces data movements caused by splitting of the disk set. Further, the effect on normal user 10 operations can be reduced, and the wear of the storage device can be decreased.

Figure 3A:
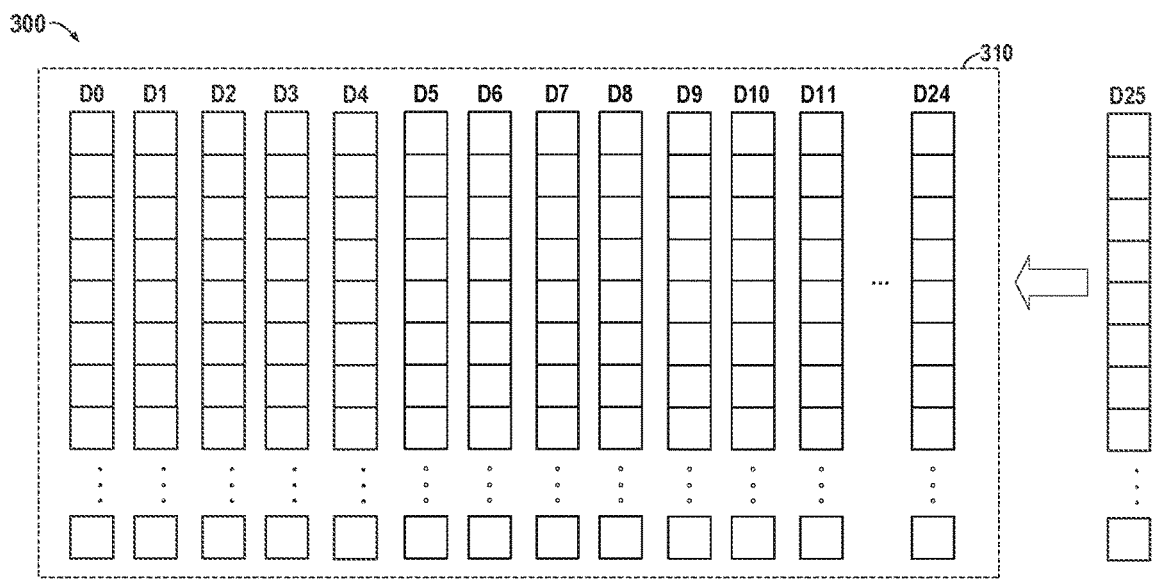
FIGS. 3A and 3B show a schematic view of an example of splitting a current disk set due to adding a new disk cording to embodiments of the present disclosure.
Figure 3B:
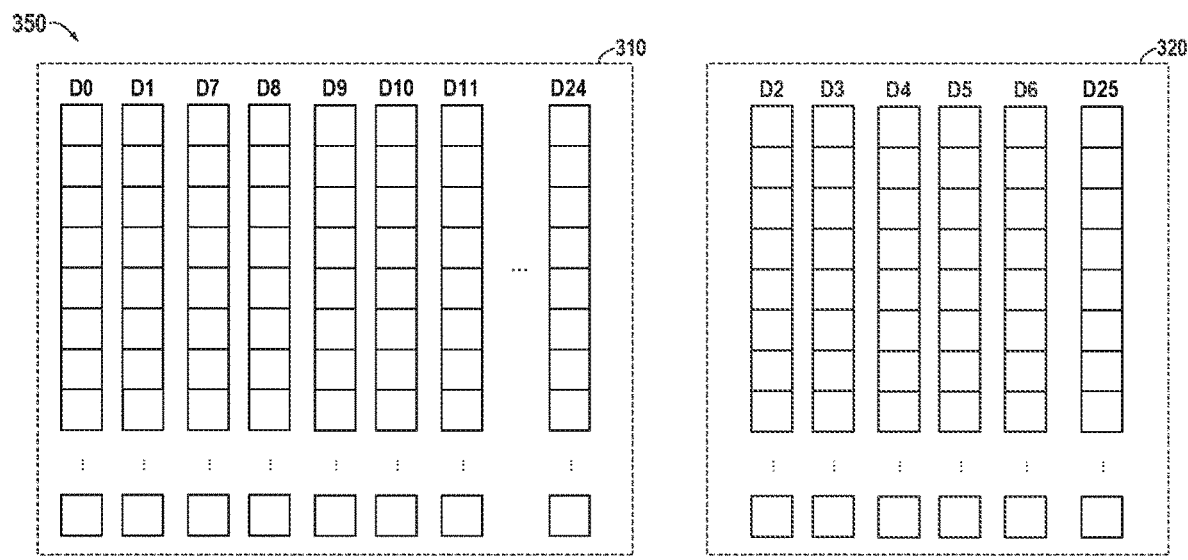
Figure 4A:
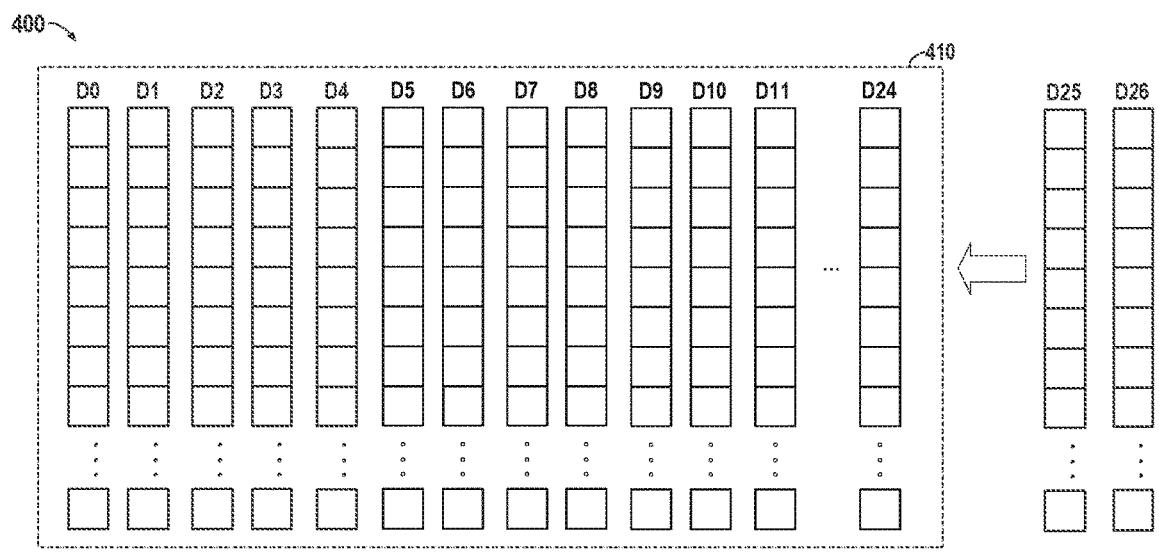
FIGS. 4A and 4B show a schematic view of another example of splitting a current disk set due to adding new disks according to embodiments of the present disclosure.
Figure 4B:
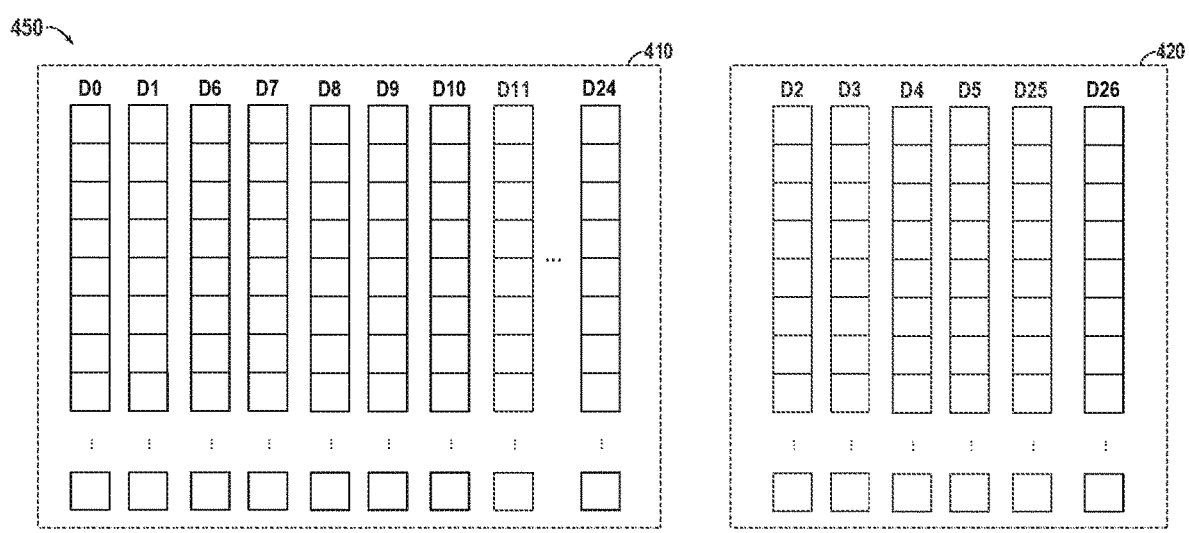

FIGS. 3A and 3B show a schematic view of an example of splitting a current disk set due to adding a new disk according to embodiments of the present disclosure. With reference to an example 300 of RAID 5 in FIG. 3A, a current disk set 310 already includes 25 disks, i.e. disks D0, D1, D2, D3, D4, D5, D6, D7, D8, D9, D10, D11 . . . D24. When a user inserts a new disk D25 to the storage system, since the disk count in the current RAID disk set 310 already reaches the upper limit (i.e. 25), the new disk cannot be added to the current RAID disk set 310. Meanwhile, only one new disk is added and cannot form one new RAID 5, because one RAID 5 usually needs six disks (one disk serves as a spare backup disk). Therefore, some disks need to be split from the current RAID disk set 310 to form another RAID disk set with the new disk D25.

With reference to an example 320 in FIG. 3B, since the new RAID disk set 320 needs at least six disks, five disks may split off from the current RAID disk set 310 to be added to the new RAID disk set 320. As shown in FIG. 3B, according to embodiments of the present disclosure, the disks D2, D3, D4, D5 and D6 are selected based on the stripe shared information in the current RAID disk set 310 for the purpose of forming the new RAID disk set 320 in combination with the new disk D25, instead of randomly selecting last few disks in the current RAID disk set. Therefore, the disks D2, D3, D4, D5 and D6 selected according to embodiments of the present disclosure have more complete stripes, so that data movements between two RAID disk sets can be reduced, as compared with the traditional methods.

FIGS. 4A and 4B show a schematic view of another example of splitting a current disk set due to adding new disks according to embodiments of the present disclosure. With reference to an example 400 of RAID 5 in FIG. 4A, a current disk set 410 includes 25 disks, i.e. disks D0, D1, D2, D3, D4, D5, D6, D7, D8, D9, D10, D11 . . . D24. When a user inserts new disks D25 and D26 to the storage system, since the disk count in the current RAID disk set 410 already reaches the upper limit (i.e. 25), the new disks cannot be added to the current RAID disk set 410. Meanwhile, only two new disks are added and cannot form one new RAID 5, because one RAID 5 usually needs six disks (one disk serves as a spare backup disk). Therefore, some disks need to be split from the current RAID disk set 410 to form another RAID disk set in combination with the new disks D25 and D26.

With reference to an example 420 in FIG. 4B, since the new RAID disk set 420 needs at least six disks, four disks may be split from the current RAID disk set 410 to be added to the new RAID disk set 420. Alternatively, five disks may be split from the current RAID disk set 410 to be added to the new RAID disk set 420. As shown in FIG. 4B, according to embodiments of the present disclosure, the disks D2, D3, D4 and D5 are selected based on the stripe shared information in the current RAID disk set 410 for the purpose of forming the new RAID disk set 420 in combination with the new disks D25 and D26, instead of randomly selecting last few disks in the current RAID disk set. Therefore, a lot of stripes share the disks D2, D3, D4 and D5 selected according to embodiments of the present disclosure, so that data movements between two RAID disk sets can be reduced, as compared with the traditional methods.

In some embodiments, in scenarios of RAID 5, when three new disks are added, three, four or five disks may be split from a current disk set; when four new disks are added, two, three, four or five disks may be split from the current disk set; and when five new disks are added, only one disk with the lowest usage percentage may be split from the current disk set.

Typically, RAID cannot be deployed across multiple disk sets. In some embodiments, after the current disk set is split, data to be moved from the current disk set to the new disk set is determined and then moved. According to embodiments of the present disclosure, since the split multiple disks contain several complete stripes and/or share stripes of several disks, data movements caused by splitting of the disk set can be reduced.

FIG. 5 shows a schematic view of an example structure 500 of stripe shared information according to embodiments of the present disclosure. As shown in FIG. 5, each record in the stripe shared information 510 includes a set of shared disks, a set of stripes, as well as a stripe count, and the stripe shared information 510 may be updated each time the storage system boots up or stripes change.

TABLE 1

| IDs of Disks Used in Stripes in RAID Disk Set | |
|---|---|
| Stripe ID | Disk IDs used in Stripes |
| 0 | 0, 1, 2, 3, 4 |
| 1 | 5, 6, 7, 8, 9 |
| 2 | 0, 1, 2, 3, 5 |
| 3 | 4, 5, 6, 7, 8 |
| 4 | 0, 1, 2, 3, 4 |

With reference to Table 1, which shows an example of disk IDs used in stripes in a RAID disk set. For example, each time a new stripe is created, disk IDs to be used by the stripe will be specified. In an example of RAID 5, one stripe uses five disks. Stripe shared information may be created by traversing disk information of each stripe. For example, regarding stripe 0 in Table 1, a record 511 is added in the first column of stripe shared information 510 of FIG. 5; regarding stripe 1 in Table 1, a record 512 is added in the first column of the stripe shared information 510; regarding stripe 2 in Table 1, a record 513 is added in the first column of the stripe shared information 510, and meanwhile a record 521 is added in the second column of the stripe shared information 510; regarding stripe 3 in Table 1, a record 514 is added in the first column of the stripe shared information 510, and meanwhile a record 522 is added in the second column of the stripe shared information 510; regarding stripe 4 in Table 1, the record 511 in the first column of the stripe shared information is updated, and meanwhile record 523 and 524 are added in the second column of the stripe shared information 510. As shown in FIG. 5, the record 511 is a stripe record sharing five disks, which includes IDs of shared disks (such as 0, 1, 2, 3, 4), stripe IDs (such as 0, 4) as well as a stripe count (such as 2).

In some embodiments, for each stripe in the current disk set, it is determined whether the stripe shared information includes a record associated with a group of disks involved in each stripe. If it is determined that the stripe shared information does not include a record associated with a group of disks involved in a given stripe, then a record associated with the group of disks is created in the stripe shared information; if it is determined that the stripe shared information includes a record associated with a group of disks involved in a given stripe, then a record associated with the group of disks is updated in the stripe shared information.

Each time a new stripe is created, the first column in the stripe shared information 510 is checked to determine whether the new stripe shares five disks with an existing stripe. If not, a new record is created; if yes, an existing record is updated. Then, the first column in the stripe shared information 510 is checked to determine whether the new stripe shares four disks with an existing stripe. If it is determined that the new stripe shares four disks with an existing stripe according to the first column, then the second column in the stripe shared information 510 is checked; if not, a new record is created; if yes, an existing record is updated. Next, the second column in the stripe shared information 510 is checked to determine whether to update the record of four shared disks.

In addition, the stripe shared information records a set of stripes sharing a predetermined number of disks, and the predetermined number is less than the RAID width. For example, in an example of RAID 5, in addition to recording stripe information sharing five disks, stripe information sharing less than five disks (such as four, three) may be also recorded. In the example of FIG. 5, stripe information sharing four disks is also shown.

Figure 6:
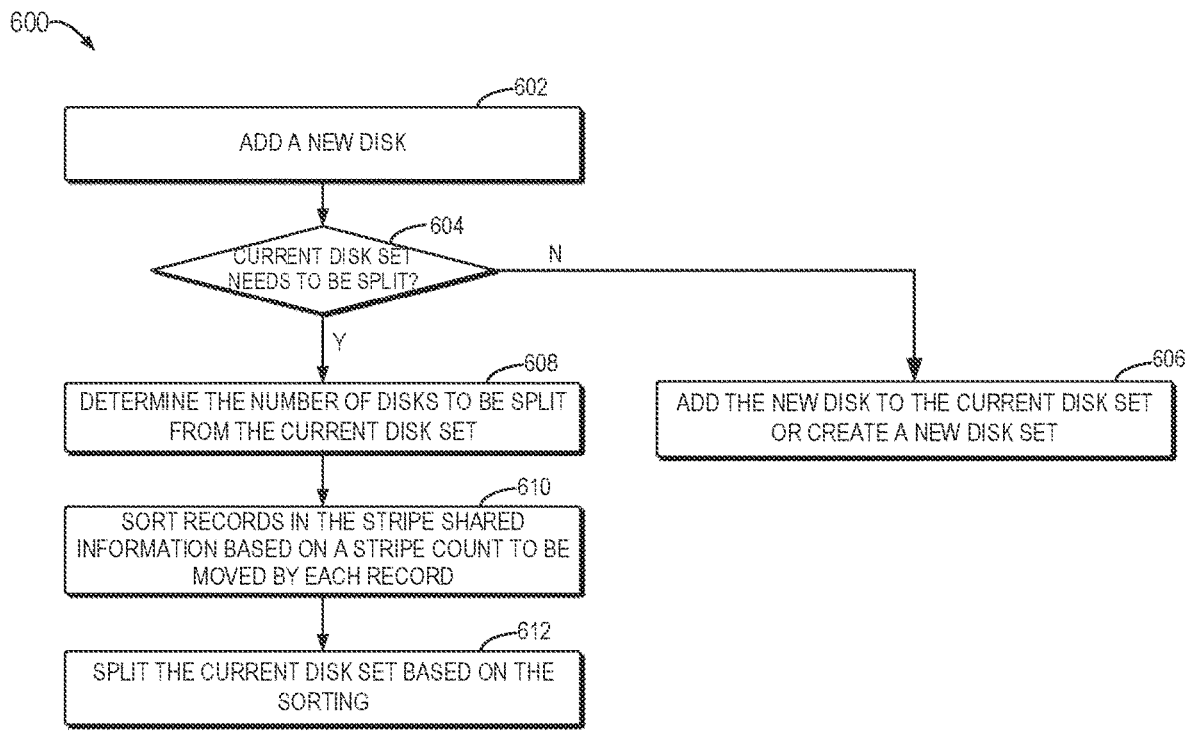
FIG. 6 shows a flowchart of another method for splitting a disk set according to embodiments of the present disclosure.

FIG. 6 shows a flowchart of another method 600 for splitting a disk set according to embodiments of the present disclosure. It should be understood the method 600 may be an example implementation of the method 200 described with reference to FIG. 2. At 602, one or more new disks are added to the storage system. For example, a user might buy a new disk and combine it with old disks into RAID.

At 604, it is determined whether a current disk set needs to be split or not. If not, then at 606, the new disk is added to the current disk set or a new disk set is created using the new disk. For example, if the sum of the number of all disks in the current disk set and the number of newly added disk is less than or equal to a certain threshold (such as 25), this means the newly added disk may be directly inserted to the current disk set without splitting the current disk set. For another example, if the sum of the number of all disks in the current disk set and the number of newly added disk is larger than a certain threshold (such as 25) and the number of newly added disks is larger than another threshold (such as 5), this means the newly added disks can form a new RAID 5, so the newly added disks directly create a new disk set without splitting the current disk set.

If it is determined that the current disk set needs to be split, then at 608 the number of disks to be split from the current disk set is determined. For example, if the sum of the number of all disks in the current disk set and the number of newly added disk is larger than a certain threshold (such as 25) and the number of newly added disks is less than another threshold (such as 5), this means one disk set is not enough and the newly added disks cannot create a new disk set (less than the minimum disk count of RAID), so the first disk set needs to be split. Next, the number of disks to be split from the current disk set is determined based on the number of newly added disks. For example, if the current disk set includes 25 disks and only one disk is newly added, then the number of disks to be split from the current disk set may be 5.

At 610, all records in a corresponding column of the stripe shared information are sorted based on a moved stripe count to be moved by each record in the corresponding column (the first column when five disks need to be split). For example, for each record in the corresponding column of the stripe shared information, a total stripe count on multiple disks involved in each record and a shared stripe count shared by the multiple disks are determined. Then, a moved stripe count to be moved when splitting the current disk set for each record is determined according to the count of all stripes and the count of shared stripes, and further all records in the corresponding column of the stripe shared information are sorted according to the moved stripe count for each record.

At 612, the current disk set is split based on the sorting. For example, a record with the smallest moved stripe count may be selected according to the sorting, and then the current disk set is split into a reserved portion and a portion for creating a new disk set.

Therefore, according to embodiments of the present disclosure, when a current disk set needs to be split due to adding a new disk, disks suitable to be split are selected using the pre-collected stripe shared information, thereby reducing data movements caused by splitting of the disk set.

Figure 7:
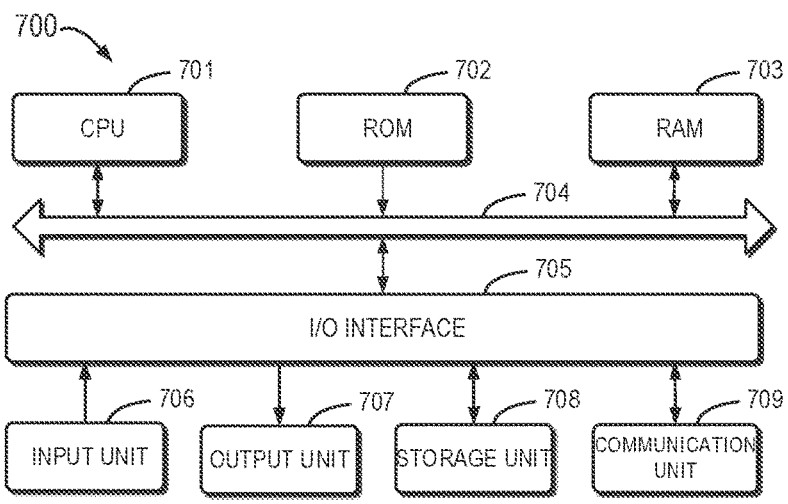
FIG. 7 shows a schematic block diagram of a device applicable to implement embodiments of the present disclosure.

FIG. 7 shows a schematic block diagram of a device 700 suitable for implementing embodiments of the present disclosure. The device 700 may be a device or an apparatus described in embodiments of the present disclosure. As depicted, the device 700 includes a central processing unit (CPU) 701 which is capable of performing various appropriate actions and processes in accordance with computer program instructions stored in a read only memory (ROM) 702 or computer program instructions loaded from a storage unit 708 to a random access memory (RAM) 703. In the RAM 703, there are also stored various programs and data required by the device 700 when operating. The CPU 701, the ROM 702 and the RAM 703 are connected to one another via a bus 704. An input/output (I/O) interface 705 is also connected to the bus 704.

Multiple components in the device 700 are connected to the I/O interface 705: an input unit 706 including a keyboard, a mouse, or the like; an output unit 707, such as various types of displays, a loudspeaker or the like; a storage unit 708, such as a disk, an optical disk or the like; and a communication unit 709, such as a LAN card, a modem, a wireless communication transceiver or the like. The communication unit 709 allows the device 700 to exchange information/data with other device via a computer network, such as the Internet, and/or various telecommunication networks.

The above-described methods or processes may be executed by the processing unit 701. For example, in some embodiments, the methods may be implemented as a computer software program, which is tangibly embodied on a machine readable medium, e.g. the storage unit 708. In some embodiments, part or the entirety of the computer program may be loaded to and/or installed on the device 700 via the ROM 702 and/or the communication unit 709. The computer program, when loaded to the RAM 703 and executed by the CPU 701, may execute one or more acts of the methods as described above.

In some embodiments, the methods and processes described above may be implemented as a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

We claim:

1. A method for splitting a disk set, comprising:
   obtaining stripe shared information in a first disk set, the stripe shared information indicating a stripe set that shares a plurality of disks;
   in response to determining that the first disk set is to be split, wherein determining that the first disk set is to be split comprises determining that a sum of a first number equal to a total number of all disks in the first disk set and a second number equal to a total number of one or more newly added disks is larger than a first threshold and that the second number is less than a second threshold, determining a number of disks to be split from the first disk set; and
   splitting the first disk set into a first portion and a second portion based on the stripe shared information and the number of disks to be split, the second portion and one or more newly added disks forming a second disk set, both the first disk set and the second disk set storing data through Redundant Array of Independent Disks (RAID).

2. The method according to claim 1, wherein obtaining stripe shared information in a first disk set comprises:
   for a given stripe in the first disk set, determining whether the stripe shared information comprises a record associated with a group of disks involved in the given stripe;
   in response to determining that the stripe shared information lacks a record associated with a group of disks involved in the given stripe, creating a record associated with the group of disks in the stripe shared information; and
   in response to determining that the stripe shared information comprises a record associated with a group of disks involved in the given stripe, updating the record associated with the group of disks in the stripe shared information.

3. The method according to claim 2, wherein obtaining stripe shared information in a first disk set further comprises:
   recording, in the stripe shared information, a stripe set that shares a predetermined number of disks, the predetermined number being less than a width of the RAID.

4. The method according to claim 1, further comprising:
   in response to the sum of the first number and the second number being less than or equal to the first threshold, adding the one or more newly added disks to the first disk set; and
   in response to the sum of the first number and the second number being larger than the first threshold and the second number being larger than the second threshold, creating the second disk set using the one or more newly added disks.

5. The method according to claim 4, wherein each record in the stripe shared information identifies a set of shared disks, a set of stripes, and a stripe count of stripes shared by all of the disks in the set of disks, and wherein determining the number of disks to be split from the first disk set comprises:
   and
   determining the number of disks to be split from the first disk set based on the second number.

6. The method according to claim 2, wherein splitting the first disk set into the first portion and the second portion comprises:
   for a given record in the stripe shared information:
      determining a total stripe count on a plurality of disks containing slices in the given stripe;
      determining a shared stripe count of stripes shared by all the plurality of disks; and
      determining a moved stripe count of stripes to be moved when splitting the first disk set using the given record based on the total stripe count and the shared stripe count.

7. The method according to claim 6, wherein splitting the first disk set into the first portion and the second portion further comprises:
   sorting all records in the stripe shared information according to a moved stripe count for each record; and
   splitting the first disk set into the first portion and the second portion based on the sorting.

8. The method according to claim 1, further comprising:
   in response to the first disk set being split into the first portion and the second portion, determining data in the first portion in the first disk set that is related to a stripe in the second portion; and
   moving the data from the first portion in the first disk set to the second disk set.

9. A device for splitting a disk set, comprising:
   a processing unit;
   a memory, coupled to the processing unit and storing instructions thereon, the instructions, when executed by the processing unit, performing acts comprising:
      obtaining stripe shared information in a first disk set, the stripe shared information indicating a stripe set that shares a plurality of disks;
      in response to determining that the first disk set is to be split, wherein determining that the first disk set is to be split comprises determining that a sum of a first number equal to a total number of all disks in the first disk set and a second number equal to a total number of one or more newly added disks is larger than a first threshold and that the second number is less than a second threshold, determining a number of disks to be split from the first disk set; and
      splitting the first disk set into a first portion and a second portion based on the stripe shared information and the number of disks to be split, the second portion and one or more newly added disks forming a second disk set, both the first disk set and the second disk set storing data through Redundant Array of Independent Disks (RAID).

10. The device according to claim 9, wherein obtaining stripe shared information in a first disk set comprises:
    for a given stripe in the first disk set, determining whether the stripe shared information comprises a record associated with a group of disks involved in the given stripe;
    in response to determining that the stripe shared information lacks a record associated with a group of disks involved in the given stripe, creating a record associated with the group of disks in the stripe shared information; and in response to determining that the stripe shared information comprises a record associated with a group of disks involved in the given stripe, updating the record associated with the group of disks in the stripe shared information.

11. The device according to claim 10, wherein obtaining stripe shared information in a first disk set further comprises:
recording, in the stripe shared information, a stripe set that shares a predetermined number of disks, the predetermined number being less than a width of the RAID.

12. The device according to claim 9, the acts further comprising:
in response to the sum of the first number and the second number being less than or equal to the first threshold, adding the one or more newly added disks to the first disk set; and
in response to the sum of the first number and the second number being larger than the first threshold and the second number being larger than the second threshold, creating the second disk set using the one or more newly added disks.

13. The device according to claim 12, wherein each record in the stripe shared information identifies a set of shared disks, a set of stripes and a stripe count of stripes shared by all of the disks in the set of disks, and wherein determining the number of disks to be split from the first disk set comprises:
determining the number of disks to be split from the first disk set based on the second number of the one or more newly added disk.

14. The device according to claim 10, wherein splitting the first disk set into the first portion and the second portion comprises:
for a given record in the stripe shared information:
determining a total stripe count on a plurality of disks containing slices in the given stripe;
determining a shared stripe count of stripes shared by all the plurality of disks; and
determining a moved stripe count of stripes to be moved when splitting the first disk set using the given record based on the total stripe count and the shared stripe count.

15. The device according to claim 14, wherein splitting the first disk set into the first portion and the second portion further comprises:

sorting all records in the stripe shared information according to a moved stripe count for each record; and
splitting the first disk set into the first portion and the second portion based on the sorting.

16. The device according to claim 9, the acts further comprising:
in response to the first disk set being split into the first portion and the second portion, determining data in the first portion in the first disk set that is related to a stripe in the second portion; and
moving the data from the first portion in the first disk set to the second disk set.

17. A computer program product having a non-transitory computer readable medium which stores a set of instructions to split a disk set; the set of instructions, when carried out by computerized circuitry, causing the computerized circuitry to perform a method of:
obtaining stripe shared information in a first disk set, the stripe shared information indicating a stripe set that shares a plurality of disks;
in response to determining that the first disk set is to be split, wherein determining that the first disk set is to be split comprises determining that a sum of a first number equal to a total number of all disks in the first disk set and a second number equal to a total number of one or more newly added disks is larger than a first threshold and that the second number is less than a second threshold, determining a number of disks to be split from the first disk set; and
splitting the first disk set into a first portion and a second portion based on the stripe shared information and the number of disks to be split, the second portion and one or more newly added disks forming a second disk set, both the first disk set and the second disk set storing data through Redundant Array of Independent Disks (RAID).

18. The method according to claim 1, wherein the second threshold comprises a minimum disk count for storing data through RAID; and
wherein the first threshold is greater than the second threshold.

19. The method according to claim 18, wherein storing data through RAID comprises storing data through RAID 5; and
wherein the second threshold comprises a value of five.

* * * * *